(12) United States Patent
Hendrian

(10) Patent No.: US 6,216,327 B1
(45) Date of Patent: Apr. 17, 2001

(54) SPOKE CENTERED PULLER TAB CRANKSHAFT DAMPER HUB

(75) Inventor: Michael D. Hendrian, Walled Lake, MI (US)

(73) Assignee: Simpson Industries, Inc., Plymouth, MI (US)

( * ) Notice: Subject to any disclaimer, the term of this patent is extended or adjusted under 35 U.S.C. 154(b) by 0 days.

(21) Appl. No.: 09/300,847

(22) Filed: Apr. 28, 1999

Related U.S. Application Data

(60) Provisional application No. 60/083,564, filed on Apr. 30, 1998.

(51) Int. Cl.[7] .................................................. B25B 27/14
(52) U.S. Cl. ............................................. 29/278; 464/68
(58) Field of Search ........................ 301/104, 74, 67; D12/204, 207, 208

(56) References Cited

U.S. PATENT DOCUMENTS

| | | |
|---|---|---|
| D. 235,431 * | 6/1975 | Scott .................................... D12/205 |
| 1,426,336 | 8/1922 | Sperry . |
| 1,975,773 | 10/1934 | Davis . |
| 2,618,052 | 11/1952 | Skaggs . |
| 3,455,104 | 7/1969 | McCullough . |
| 3,846,898 | 11/1974 | Kerr . |
| 4,634,166 | 1/1987 | Pool . |
| 4,864,709 | 9/1989 | Klucz . |
| 4,868,965 | 9/1989 | Drymon . |
| 4,930,966 | 6/1990 | Chien . |
| 5,231,893 | 8/1993 | Sisco . |
| 5,634,851 | 6/1997 | Albers . |
| 5,695,034 | 12/1997 | Graton . |
| 5,843,264 | 12/1998 | Mabuchi . |

* cited by examiner

Primary Examiner—David A. Scherbel
Assistant Examiner—Daniel Shanley

(57) ABSTRACT

A crankshaft damper hub (10) for attachment to an engine crankshaft (34) has an outer rim (44) and a center portion (46). The center portion (46) has a passageway (56) formed therethrough for receipt of an engine crankshaft (34). A plurality of spokes (60) extend between the outer rim (44) and the center portion (46). An opening (66) is formed in each of the plurality of spokes (60) with a tab (72) formed therein for engagement with a tool to facilitate removal of the hub (10) from the crankshaft (34).

13 Claims, 4 Drawing Sheets

SPOKE CENTERED PULLER TAB CRANKSHAFT DAMPER HUB

CROSS REFERENCE TO RELATED APPLICATIONS

This application claims priority from co-pending U.S. Provisional Application Serial No. 60/083,564, which was filed on Apr. 30, 1998.

TECHNICAL FIELD

The invention relates generally to a damper hub for a crankshaft. More specifically, the present invention relates to a crankshaft damper hub with spoke centered puller tabs to allow the hub to be more easily removed from the crankshaft.

1. Background Art

It is well known in the automotive industry to utilize crankshaft damper hubs to reduce to overall noise transmitted through an engine assembly. The crankshaft damper hub is typically positioned at or near the front of the engine assembly and drives a plurality of other devices similarly located. Current hubs are difficult to remove from the crankshaft when repairs, maintenance or other work needs to be performed on the engine. One example of these hubs utilizes threaded puller holes formed therein to assist in their removal. The manufacture of this type of hub has required two machining operations (drilling and tapping) which increased the cost of the hub and the possibility of missed machining operations.

Other prior damper hub designs have utilized tab designs to assist in removing the hub from the crankshaft. One such prior art damper hub is illustrated in FIG. 1. The damper hub 10 includes an outer rim portion 12 having an outer peripheral surface 14, an inner peripheral surface 16, and a center portion 18 having a passageway 20 that is formed therethrough. Three spokes 22 extend between the center portion 18 and the outer rim portion 12 while the area between the spokes is generally open. A plurality of tabs 24 extend outwardly from the center portion 18 of the hub 10 and are generally disposed between each of the spokes 22 allowing the damper hub 10 to be pried off the crankshaft through the use of the tabs. This design, however, as well as others like it, still suffer from an inability to remove the damper hub easily from the crankshaft to which it is attached. Further, these tabs are also subject to breaking.

2. Summary of the Invention

It is an object of the present invention to provide a damper hub having openings formed in the spokes that allow a puller tool to pass therethrough to facilitate removal of the damper hub from the crankshaft.

It is a further object of the present invention to provide a damper hub having a tab design that is stronger and more durable than other designs.

It is yet another object of the present invention to provide a damper hub with increased torque capacity that is also safer than prior hub designs.

In accordance with these and other objects of the present invention, a damper hub for attachment to an engine crankshaft is provided. The damper hub has a generally circular outer rim having an inner periphery and an outer periphery and a center portion having an inner periphery and an outer periphery. The inner periphery of the center portion is generally circular in shape and defines a passageway therethrough for receipt of the engine crankshaft therein. A plurality of spoke members extend between the center portion and the generally circular outer rim of the damper hub. Each of the spokes has an opening formed therethrough with a tab formed in or adjacent to the opening for engagement with a tool to facilitate removal of the crankshaft hub.

Other objects and features of the present invention will become apparent when reviewed in light of the detailed description of the best mode(s) of the invention preferred embodiment when taken in conjunction with the attached drawings and appended claims.

BEST MODE(S) OF THE INVENTION

Figure 2:
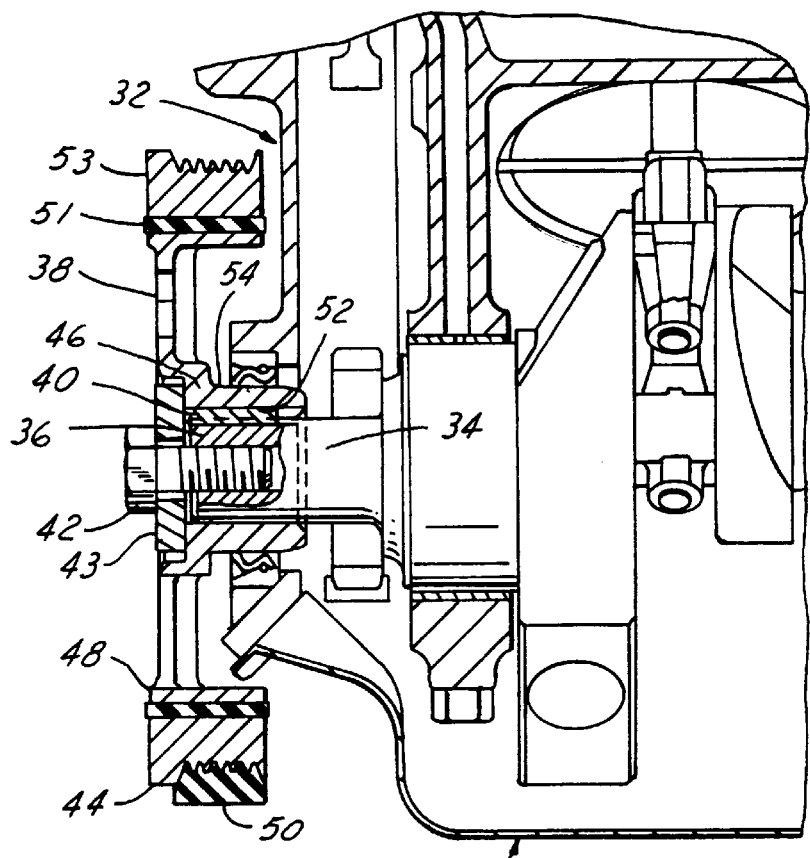
FIG. 2 is a schematic illustration of a crankshaft damper hub mounted on the front surface of an engine assembly in accordance with a preferred embodiment of the present invention.

FIG. 2 illustrates an engine assembly 30 having a front face 32 and an engine crankshaft 34 having an end 36 extending through the front face 32 of the engine assembly 30. A damper hub 38 is mounted to an end 36 of the crankshaft 34. A damper 40 is preferably positioned at the crankshaft end 36 in order to minimize noise, vibration, and harshness which can be transmitted through the crankshaft 34 engine assembly 30. As is well known, the hub 38, which is driven by the crankshaft 34, is in communication with a belt or chain to drive other pumps or components. The hub 38 is securely mounted to the crankshaft 34 by a securing means 42 such as a bolt or the like to prevent disengagement of the hub 38 from the engine crankshaft 34. A washer 43 is disposed between the securing means and the hub 38.

The hub 38 includes an outer rim portion 44 and a center portion 46. The outer rim portion 44 has an inner periphery 48 and an outer periphery 50. The outer periphery 50 of the hub 38 is designed to receive an elastomeric spring 51 and interior ring 53 which drives various other pumps and exterior mechanisms secured to the front face 32 of the engine 30. The center portion 46 includes an inner periphery 52 and an outer periphery 54. The inner periphery 52 defines a passageway 54 which receives the end 36 of the engine crankshaft 34 therein. The hub 38 is secured to the crankshaft end 36 by the securing means 42 which is passed through an opening 58 formed in the center portion 46.

Figure 3:
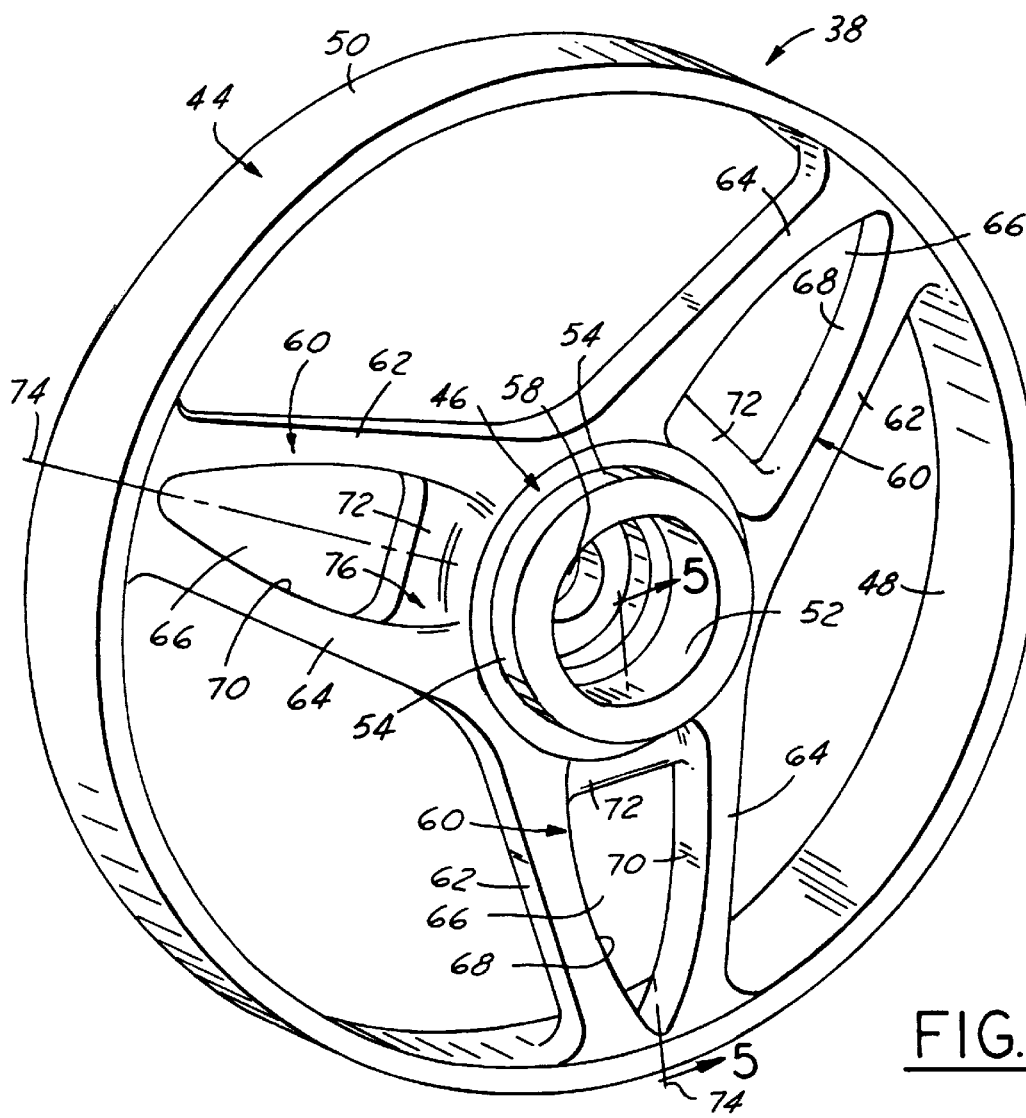
FIG. 3 is a rear view of a spoked damper hub having an opening formed in each spoke in accordance with a preferred embodiment of the present invention.
Figure 5:
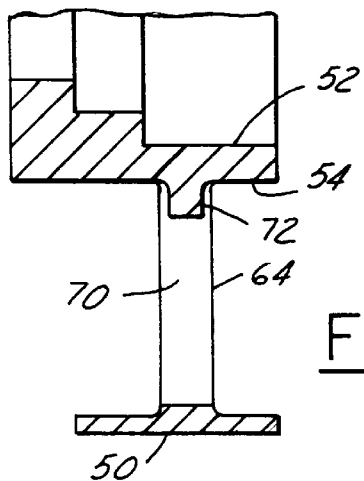
FIG. 5 is a cross-sectional view of the spoked damper hub of FIG. 4 along the line 5—5.

A plurality of spokes 60 preferably extend between the inner periphery 48 of the outer rim portion 44 and the outer periphery 54 of the center portion 46. As shown in FIGS. 3 and 5, in one embodiment three spokes are preferably included and are preferably evenly spaced around the center portion 46. It should be understood, however, that the number of spacing of the spokes 60 may be varied. The spokes 60 preferably have a first leg 62 and a second leg 64 that are split lengthwise and apart at their connection to the center portion 46 of the hub 36. The splitting apart of the first leg 62 and the second leg 64 defines an opening 66 in the spokes 60. The opening is defined by an inner surface 68 of the first leg 62, an inner surface 70 of the second leg 64, and a tab 72 extending outwardly from the center portion 46. Each opening 66 is preferably uniform in shape and is bisected by a radial centerline 74 of the spoke 60 which extends outwardly from the center portion 46.

A tab 72 is disposed in each of the openings 66 at the radial centerline 74 of each spoke 60 with the forward edge 76 of each of the tabs 72 being perpendicular to the centerline 68. The tab 72 is also preferably recessed with respect to the upper surfaces of the first and second legs 62, 64. In this position, the tab 72 is adjacent to and strengthened by the diameter of the outer periphery 54 of the center portion 46, the inner surface 68 of the second leg 62, and the inner surface 68 of the second leg 64. The tab 72 therefore is supported on three sides. Further, the opening 66 between the inner surfaces 68, 70 of the first and second legs 62, 64 provide positive location surfaces for a puller tool jaw which can pass through the opening 66 to assist in removing the hub 38. Also, the split leg configuration increases the section modulus of the spoke 60 in the plane through which the hub rotates, thus providing an increased torque capacity of the hub 38. This also provides a damper hub with an increased factor of safety.

Figure 4:
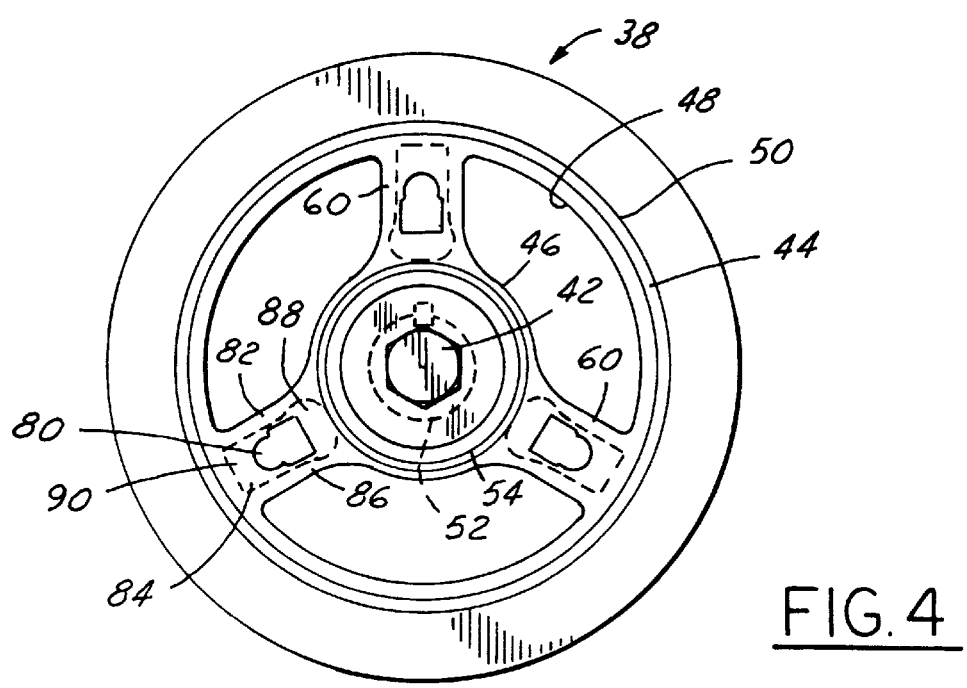
FIG. 4 is a front view of a spoked damper hub having an opening formed in each spoke in accordance with another preferred embodiment of the present invention.

FIG. 4 illustrates another preferred embodiment of a damper hub 38 in accordance with the present invention. As shown in FIG. 4, the configuration of the spokes 60 differs from that of FIG. 3. Each of the spokes 60 has an opening 80 formed in a top surface 82 and a larger pocket 84 formed in a bottom surface 86. The differing sizes between the top opening 80, and the bottom opening 84 creates a tab 88 adjacent the center portion 46 and a tab 90 adjacent the outer rim portion 44. Thus, a puller tool, as discussed herein below, can engage tab 88 to remove the hub 38 from the crankshaft 34.

Figure 1:
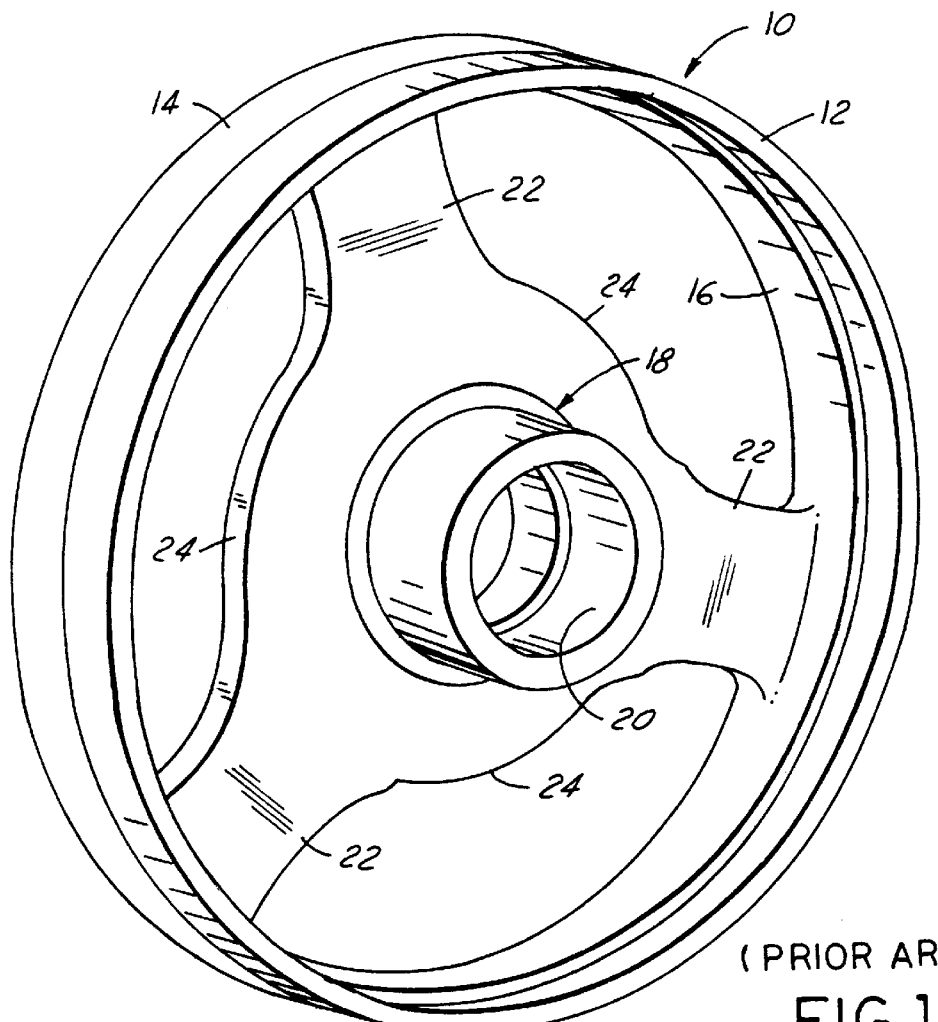
FIG. 1 is a schematic illustration of a prior art spoked crankshaft damper hub having a plurality of tabs located between adjacent spokes of the damper hub.
Figure 6:
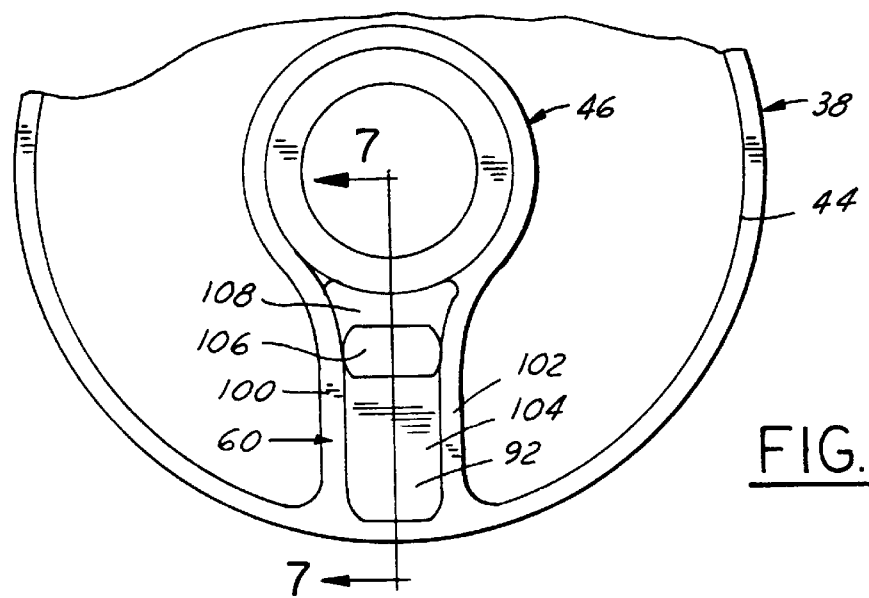
FIG. 6 is a front view of a spoked damper hub in accordance with another preferred embodiment of the present invention.
Figure 7:
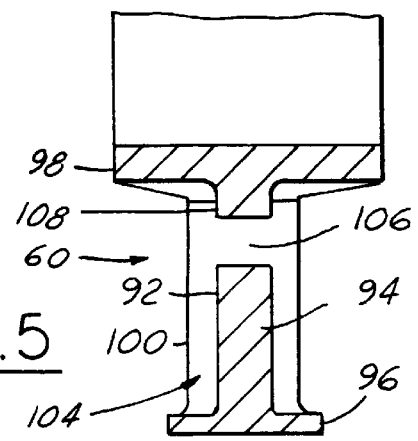
FIG. 7 is a cross-sectional view of the spoked damper hub of FIG. 6 along the line 7—7.

FIGS. 6 and 7 illustrate another embodiment of a damper hub 38 in accordance with another preferred embodiment. The damper hub 38 has an outer rim portion 44, a center portion 46, and three spokes 60 extending between the outer rim portion 44 and the center portion 46. Each of the spokes 60 has a top surface 92 and a bottom surface 94. The bottom surface 94 of the spokes 60 are preferably facing the front face 32 of the engine assembly 30 when the hub 38 is mounted on the crankshaft 34. Each spoke 60 has a generally I-beam shape with the top surface 92 and the bottom surface 94 of the spoke being recessed with respect to the edges 96 of the outer rim and the edges 98 of the center portion 46.

Each of the spokes 60 has a first portion 100 and a second portion 102 that bound the recess 104 and extend between the center portion 46 and the outer rim 44. Each of the spokes 60 has an opening 106 formed in the spoke that is formed between the first portion 100 and the second portion 102 of the spoke 60. The opening 106 extends through the top surface 92 and the bottom surface 94. The formation of the opening 106 reveals a tab 108 for engagement with a puller tool. The tabs 108 are located on the centerline of the generally I-beam shaped spokes 60. This placement of the tabs 108 utilizes material already present in the interior of the spokes 60 as the tab material, thus eliminating the need for the addition of tab material as is required in current designs. The result is a stronger and safer damper hub 38.

Figure 8:
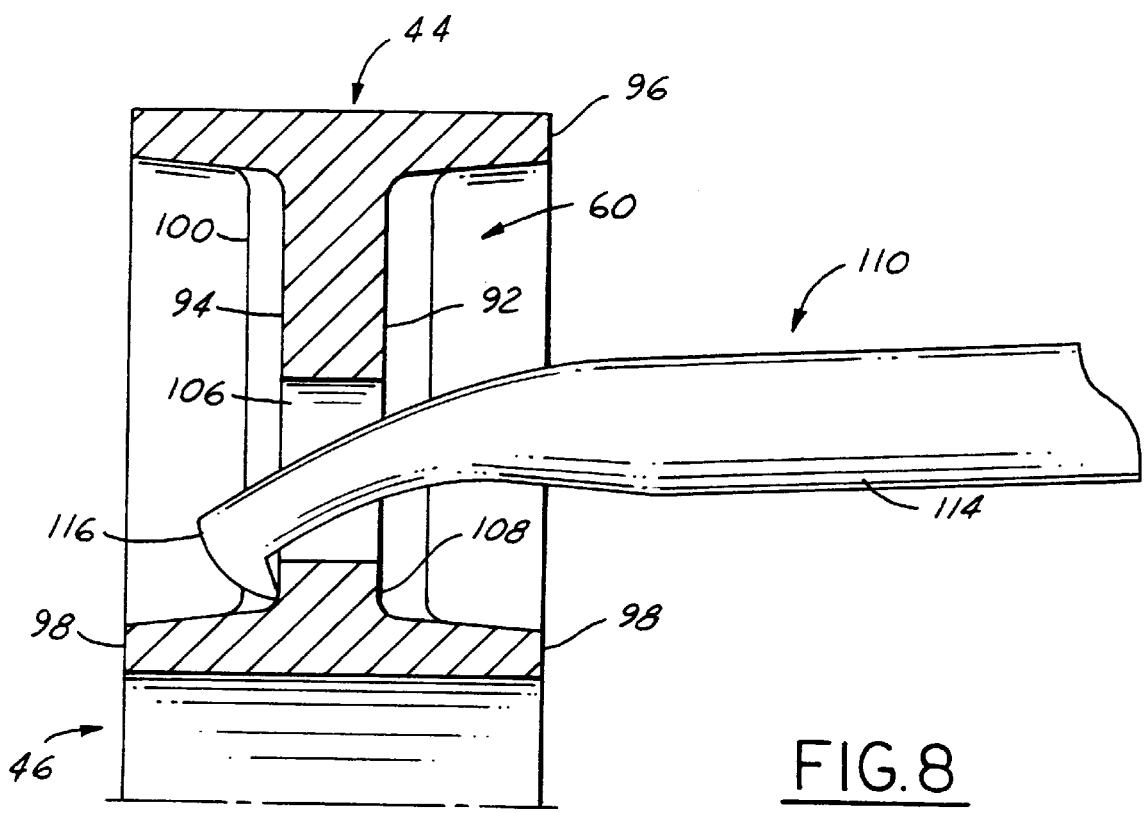
FIG. 8 is a schematic illustration of a tool for removing a spoked damper hub from an end of a crankshaft in accordance with a preferred embodiment of the present invention.

FIG. 8 illustrates a puller tool 110 in accordance with the present invention. The puller tool 110 includes a stem portion 114 and a hooked tip portion 116. The hooked tip portion 116 preferably passes through the opening 106 and engages the underside of the tab 108 allowing the hub 36 to be pried off the crankshaft 34. For optimum usage, the puller tool 110 includes three stem portions 114 and these tip portions 116 that are designed to pass through openings 106 in respective spokes 60 and engage respective tabs 108 simultaneously. Thus, the hub 36 will be removed by applying pressure to the underside of each of the tabs 108 at the same time. It should be understood that the puller tool 110 may be utilized with any of the disclosed embodiments. Further, the puller tool 110 may take on a variety of different shapes and configurations.

While particular embodiments of the invention have been shown and described, numerous variations and alternate embodiments will occur to those skilled in the art. Accordingly, it is intended that the invention be limited only inn terms of the appended claims.

What is claimed is:

1. A damper hub for attachment to an engine crankshaft, comprising;
   a generally circular outer rim having an inner periphery and an outer periphery, said outer periphery designed to contact a drive belt;
   a center portion having an outer periphery and an inner periphery, said inner periphery defining a passageway therethrough for receipt of the engine crankshaft;
   a plurality of spoke members extending from said center portion to said generally circular outer rim;
   an opening formed in at least one of said plurality of spokes;
   a radial extending tab formed in said opening for engagement with a total to facilitate removal of the crankshaft hub from an end of the engine crankshaft.

2. The damper hub as recited in claim 1, wherein three spoke members extend from said center portion to said outer rim, said three spoke members being equally spaced around said outer periphery of center portion.

3. The damper hub as recited in claim 1, wherein each of said plurality of spoke members has an opening formed therein for receipt of said tool therethrough.

4. The damper hub as recited in claim 1, wherein each of said plurality of spoke members has a first leg and a second leg that are spaced apart from one another and define said opening.

5. The damper hub and recited in claim 4, wherein said tab is bounded on either side by said first leg and said second leg at its rear surface by said center portion.

6. The damper hub as recited in claim 1, wherein at least on of said plurality of spokes has a generally I-beam shape.

7. The damper hub as recited in claim 6, wherein said spoke includes an interior portion that is recessed with respect to a first leg and a second leg of said spoke.

8. The damper hub as recited in claim 7, wherein said opening is formed through said recessed interior portion.

9. A crankshaft damper hub comprising:
   an outer rim portion having an inner periphery and an outer periphery, said outer periphery designed to contact a drive belt;
   a center portion having a passageway formed therethrough for receipt of an engine crankshaft;

at least one spoke member extending between said center portion of said outer rim portion, said at least one spoke member having a radial centerline and a pair of opposing legs that are equally spaced from said radial centerline;

an opening formed in said at least one spoke member;

a radial extending tab formed in said opening to facilitate removal of the damper hub from said engine crankshaft.

10. The damper hub as recited in claim 9, wherein said tab is recessed from a top surface of each of said pair of opposing legs.

11. The damper hub as recited in claim 9, wherein said tab is recessed from a bottom surface of each of said pair of opposing legs.

12. The damper hub as recited in claim 9, wherein said tab is bordered on one said by one said pair of opposing legs and on an opposing side by the other said pair of opposing legs.

13. The damper hub as recited in claim 12, wherein said tab is bordered on one said by one said pair of opposing legs and on an opposing side by the other said pair of opposing legs.

* * * * *

UNITED STATES PATENT AND TRADEMARK OFFICE
CERTIFICATE OF CORRECTION

PATENT NO.     : 6,216,327 B1  
DATED          : April 17, 2001  
INVENTOR(S)    : Hendrian It is certified that error appears in the above-identified patent and that said Letters Patent is hereby corrected as shown below:

<u>Column 4,</u>
Line 39, please change the word "total" to -- tool --.

Signed and Sealed this

Second Day of July, 2002

Attest:

Attesting Officer

JAMES E. ROGAN
Director of the United States Patent and Trademark Office